United States Patent [19]

van der Lely et al.

[11] 3,902,437

[45] Sept. 2, 1975

[54] CULTIVATOR AND TRACTOR COMBINATIONS

[76] Inventors: Ary van der Lely, 10, Weverskade, Maasland; Cornelis Johannes Gerardus Bom, 36, Esdoornlaan, Rozenburg, both of Netherlands

[22] Filed: July 2, 1974

[21] Appl. No.: 485,258

Related U.S. Application Data

[60] Continuation of Ser. No. 393,025, Aug. 30, 1973, abandoned, which is a division of Ser. No. 166,089, July 26, 1971, Pat. No. 3,774,688.

[30] Foreign Application Priority Data
July 30, 1970 Netherlands............................ 11316

[52] U.S. Cl......................................... 111/2; 172/68
[51] Int. Cl. ......................... A01c 5/04; A01b 33/06
[58] Field of Search............. 172/21, 22, 42, 43, 59, 172/63, 68, 71, 111, 177, 540, 554; 111/2, 4, 92, 99

[56] References Cited
UNITED STATES PATENTS

| | | | |
|---|---|---|---|
| 23,558 | 4/1859 | Duane................................... | 111/11 |
| 517,352 | 3/1894 | Maxwell........................... | 172/554 X |
| 571,827 | 11/1896 | Burdge............................ | 172/177 X |
| 1,689,262 | 10/1928 | Van Den Ende...................... | 111/91 |
| 2,625,122 | 1/1953 | Carelock............................ | 172/21 X |
| 2,674,962 | 4/1954 | Strezoff.............................. | 172/21 X |
| 2,727,476 | 12/1955 | Jones.................................. | 172/21 X |
| 3,616,862 | 11/1971 | Lely................................... | 172/68 X |
| 3,667,551 | 6/1972 | Lely et al......................... | 172/111 X |

FOREIGN PATENTS OR APPLICATIONS

| | | | |
|---|---|---|---|
| 15,351 | 8/1929 | Australia.............................. | 172/43 |
| 245,757 | 3/1926 | Italy...................................... | 172/42 |
| 161,160 | 3/1964 | U.S.S.R.................................. | 111/2 |

*Primary Examiner*—Edgar S. Burr
*Assistant Examiner*—Paul T. Sewell
*Attorney, Agent, or Firm*—Mason, Mason & Albright

[57] ABSTRACT

A rotary harrow has a row of soil working members mounted on upwardly extending shafts, the row extending transverse to the normal direction of travel. The soil working members have spaced apart tines that are positioned to work overlapping strips of soil when rotated. A driving arrangement to pinions on the shafts rotates each soil working member in an opposite direction from its adjacent members. A planting device, which can be a spiked roller, is mounted to the rear of the soil working members so that planting can be immediately carried out in the freshly worked soil.

4 Claims, 4 Drawing Figures

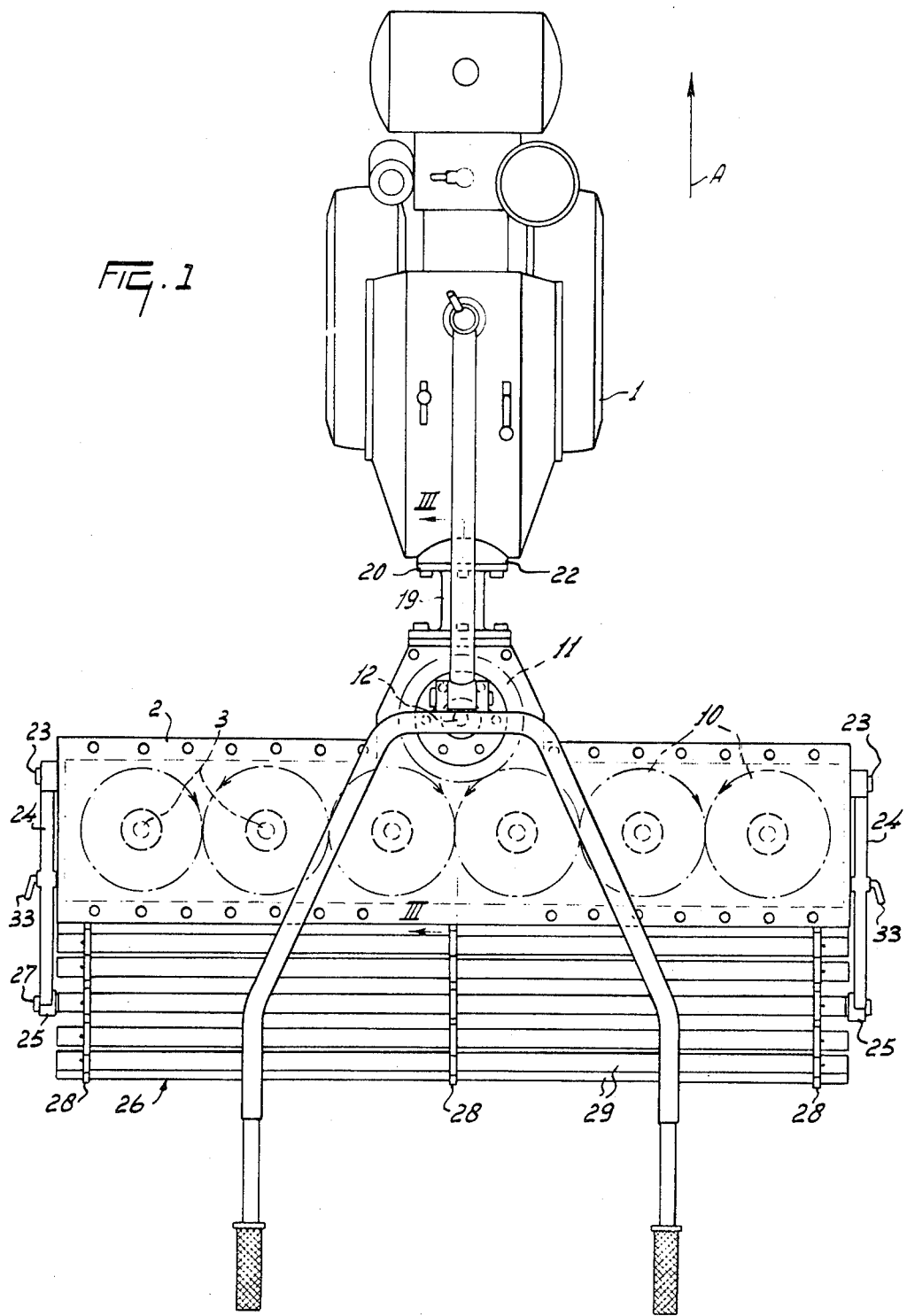

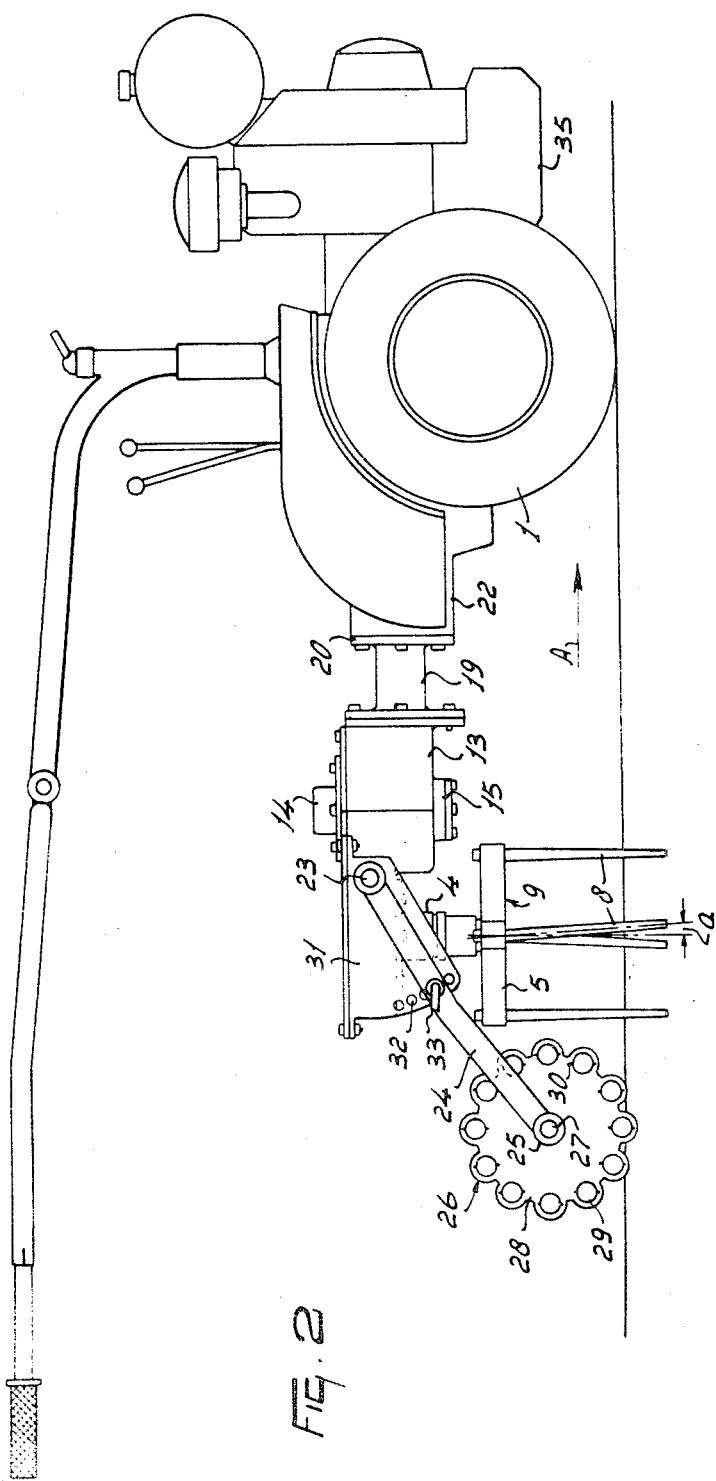

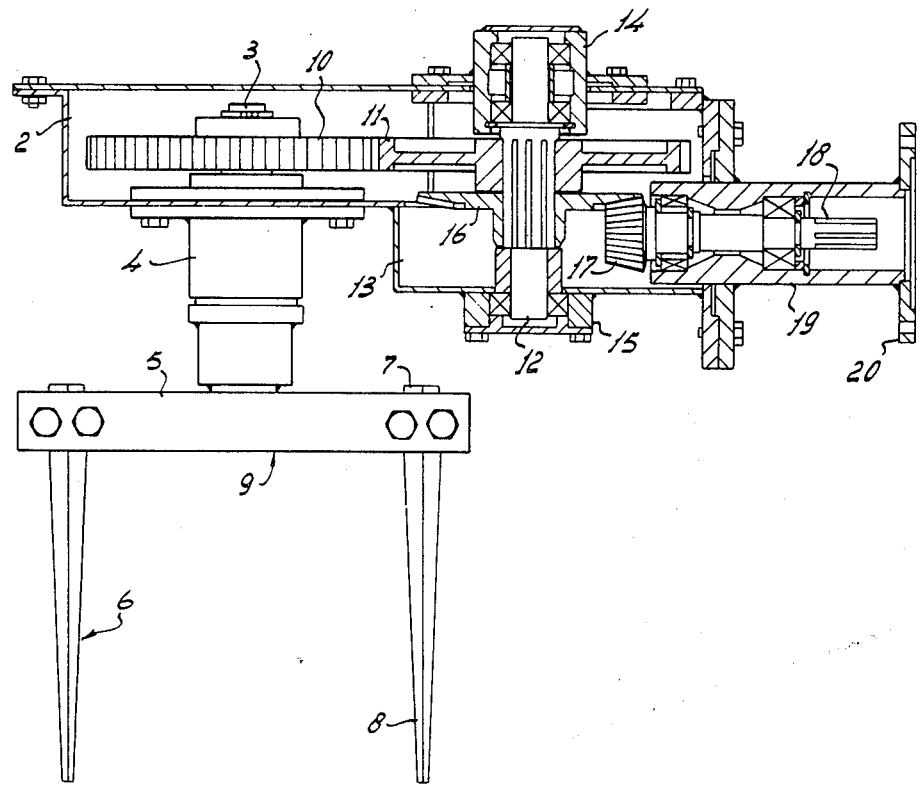

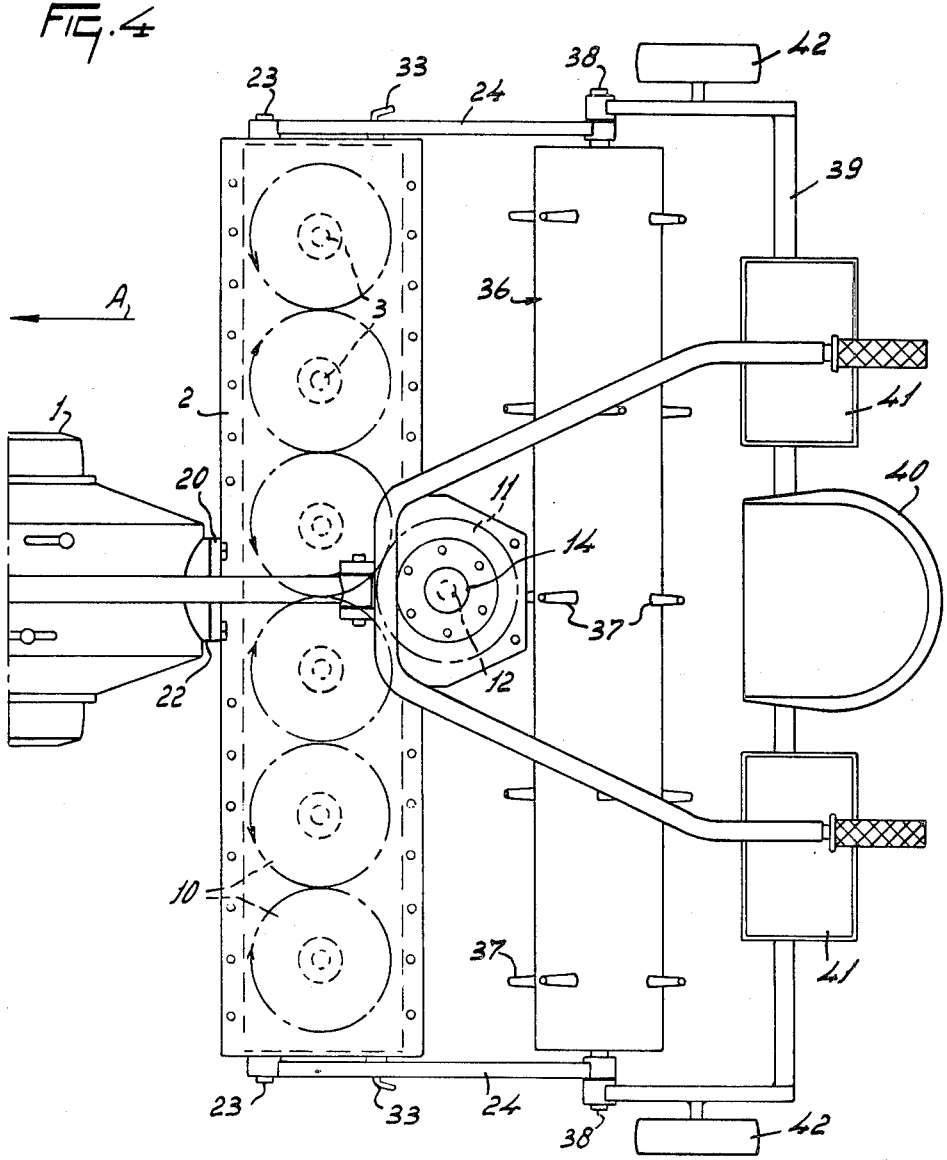

CULTIVATOR AND TRACTOR COMBINATIONS

This application is a continuation of Ser. No. 393,025 filed Aug. 30, 1973, now abandoned which is a division application of U.S. Ser. No. 166,089, filed July 26, 1971, now U.S. Pat. No. 3,774,688.

For a better understanding of the invention, and to show how the same may be carried into effect, reference will now be made, by way of example, to the accompanying drawings, in which:

FIG. 1 is a plan view of a rotary harrow in accordance with the invention,

FIG. 2 is a side elevation corresponding to FIG. 1,

FIG. 3 is a section, to an enlarged scale, taken on the line III—III of FIG. 1, and FIG. 4 is a plan view illustrating an alternative form of a rotary harrow in accordance with the invention.

Referring to FIGS. 1 to 3 of the drawings, the harrow that is illustrated is coupled to a small tractor 1 of a kind constructed so as to be suitable for use in relatively small areas such as with the horiculture in the interiors of greenhouses, hothouses, propagating houses and the like or with the viniculture. The harrow or cultivator has a frame that is afforded principally by a hollow box-shaped beam 2 that extends substantially horizontally and substantially perpendicularly transverse to the intended direction of operative travel of the combination, this latter direction being indicated by an arrow A in FIGS. 1, 2 and 4 of the drawings. Six upright substantially vertical shafts 3 are rotatably journalled in the hollow beam 2 in a single row that again extends substantially perpendicularly transverse to the direction A. The shafts 3 are mounted in corresponding bearings 4 (FIG. 2) located immediately beneath the beam 2. The shafts 3 are regularly spaced apart from one another by a distance which is preferably about 25 centimeters. The top of the beam 2 is constructed so that all, or at least part of it can be removed to obtain access to the interior of the beam.

The shafts 3 that project downwardly from the bottom of the beam 2 are provided, at their lowermost ends, with corresponding tine supports 5. FIGS. 2 and 3 show a construction in which each tine support 5 takes the form of two substantially parallel and horizontally extending strips between the opposite ends of which the fastening portions 7 of two tines 6 are clamped by pairs of bolts, the arrangement being such that the shanks of the bolts project into grooves (not visible) in the fastening portions 7 so that the tines 6 cannot move upwardly and downwardly relative to their supports 5. Each tine 6 is of angular, and preferably square, cross-section and has a soil working portion 8 that tapers gently in a downward direction towards its free end or tip. The tines 6 and their supports 5 together constitute soil working members 9 and it will be noted that the straight soil working portion 8 of each tine 6 is inclined by an angle of slightly less than 180° to the fastening portion 7 of the same tine. The fastening portions 7 are arranged in their holders 5 in such a way that the soil working portions 8 trail or drag slightly with respect to the intended direction of rotation of the soil working members 9 concerned, these directions of rotation being indicated by arrows in FIG. 1 of the drawings. The soil working members 9 are rotatable about the axes of the corresponding shafts 3 and, since the perpendicular distances between the free ends or tips of the soil working portions 8 of each member 9 are slightly greater than the perpendicular distances between neighbouring shafts 3, the supports 5 of neighbouring soil working members 9 are angularly offset about their shafts 3 to avoid the tines 6 fouling one another during operation of the combination, the angle of offset preferably being about 90° as shown in FIG. 2 of the drawings.

Each shaft 3 is provided inside the hollow beam 2 with a corresponding pinion 10 and the teeth of each pinion 10 are in mesh with those of its neighbour, or both of its neighbours. One of the central pair of pinions 10 of the row thereof also has its teeth in driven communication with those of a pinion 11 (FIGS. 1 and 3) mounted on a substantially vertical shaft 12 that is disposed in front of the row of soil working members 9 with respect to the direction A. The pinion 11 and shaft 12 are located inside a gear box 13 and the shaft 12 is rotatably journalled in an upper bearing 14 and a lower bearing 15. A bevel pinion or crown wheel 16 is mounted on the shaft 12 immediately beneath the pinion 11 and its teeth are in driven mesh with those of a smaller bevel pinion 17 secured, inside the gear box 13, to the end of a substantially horizontal rotary input shaft 18 that projects forwardly from the gear box 13 inside a housing 19 that has a flange 20 at its leading end. The shaft 18 extends in the direction A and it will be noted that it is located at a lower horizontal level than that of the pinions 10.

As can be seen in FIG. 1 of the drawings, the flange 20 at the leading end of the housing 19 is secured by bolts to a housing 22 of the tractor 1 from which projects the power take-off shaft of the tractor. A driving connection is, of course, established between the power take-off shaft of the tractor 1 and the rotary input shaft 18 of the gear box 13. The hollow frame beam 2 is provided, at its opposite ends and towards its front with respect to the direction A, with substantially horizontally aligned stub shafts 23 about which corresponding rearwardly extending arms 24 are turnable. The ends of the arms 24 that are remote from the stub shafts 23 carry horizontal bearings 25 in which the central shaft 27 of a soil compressing member, in the form of a roller 26, is rotatably received. The roller 26 includes three generally circular support plates 28 that are secured to the central shaft 27 with one of them midway along that shaft and the other two at equal distances therefrom towards the opposite ends of the shaft. The peripheries of the support plates 28 are formed with twelve apertures in which twelve tubes 29, of circular cross-section, are mounted so as to extend parallel to the shaft 27 at regular intervals around the axis of that shaft. The tubes 29 can turn around their own longitudinal axes in the apertures in the support plates 28 but they are prevented from becoming detached from the support plates by transverse pins 30 (FIG. 2) that are entered through them immediately alongside the relatively remote surfaces of the two support plates 28 that are located adjacent the opposite ends of the roller 26. Generally sector-shaped support plates 31 are secured to the opposite ends of the hollow frame beam 2 and each plate 31 is provided, alongside its curved rearmost edge, with a row of holes 32 any chosen one of which can receive the tip of a horizontal locking pin 33 carried by the closely adjacent arm 24. It will be evident that the centers of curvature of the rows of holes 32 are coincident with the common axis of the stub shafts 23 and that the preferably spring-loaded locking pins 33 carried by the arms 24 can be entered in chosen holes 32 to maintain the arms 24 in corresponding angular settings about the stub shafts 23. The chosen settings of the arms 24 determine the horizontal level of the axis of rotation (afforded by the shaft 27) of the roller 26 relative to the horizontal level of the frame of the cultivating implement or cultivator.

In the use of the tractor and cultivator combination which has been described, the combination moves forwardly in the direction A under the control of a pedestrian holding the forked handles of the tractor 1 that can be seen in the drawings. The soil working members 9 rotate in the directions indicated by the arrows in FIG. 1 of the drawings and their tines work six overlapping strips of soil so that, in effect, a single strip of soil that preferably has a width of about 150 centimeters is intensively mixed and crumbled during a single traverse of the combination. A uniform distribution of the crumbled soil is produced and this results in a soil consistency that is ready for the introduction of seeds or young plants that are to grow on towards maturity. The cultivating implement or cultivator bears upon the soil by way of the roller 26 during operation of the combination and it will be seen from FIG. 2 of the drawings that the angular settings of the arms 24 about the stub shafts 23 that are chosen thus determine the working levels of the members 9, that is to say, the depth of penetration of their tines 6 into the soil. The roller 26 slightly compresses the worked soil and any remaining lumps thereof tend to be broken up by the tubes 29 which tubes, it will be remembered, are movable relative to one another and to their support plates 28.

The roller 26 is disposed immediately to the rear of the paths that are traced by the tips of the tines 6 during the use of the combination and this has the advantage that any soil or other material that sticks to the tines 6 tends to be scraped, or knocked, off those tines by the roller 26. The combination is readily steerable and otherwise manageable since the tractor 1 is provided in front of its single axle with a counterweight 35 and, as previously mentioned, the combination is particularly, but not exclusively, suitable for use with horticulture in greenhouses, hothouses, propagating houses or the viniculture where its preferred working width of about 150 centimeters is an appropriate and manageable dimension. The perpendicular distance between the row of soil working members 9 and the coupling point (flange 20) of the cultivator to the tractor 1 is preferably not more than 50 centimeters. If, as is preferred, the tractor 1 incorporates a four ratio gear box in the drive to its power take-off shaft, then any one of four different speeds of rotation can be chosen for the soil working members 9 to correspond to a single speed of travel in the direction A. Soil can usually be brought to a condition in which it is ready to receive seeds or small plants by a single traverse of the tractor and cultivator combination which has been described.

FIG. 4 of the drawings shows an alternative construction in which the pinion 11 that transmits drive to the pinions 10 is located behind the latter pinions with respect to the direction A rather than in front thereof. The construction of the transmission to the soil working members 9 is otherwise substantially identical to that which has already been described but the arrangement of the pinion 11 to the rear of the row of pinions 10 enables the soil working members 9 to be even closer to the tractor 1 so that an improvement in manoeuvrability results. The previously described peripherally apertured roller 26 is replaced by a soil compressing member in the form of a planting roller 36, said roller 36 having five laterally spaced apart arrays of pins or spikes 37 adapted to form continuous rows of planting holes. Horizontally aligned central stub shafts 38 at the opposite ends of the roller 36 not only connect the roller to the arms 24 but also pivotally connect a mobile structure 39 to the arms 24. The structure 39 carries a central seat 40 and troughs or boxes 41 at opposite sides of said seat in which a supply of small plants or other items can be carried. Lateral parts of the structure 39 are provided with two ground wheels 42 and the structure 39 and the parts which it carries bears upon the soil, during the use of the combination, by way of said ground wheels 42. The planting roller 36 once again supports the cultivating implement or cultivator during its passage over the soil, the arms 24 being arranged to occupy different angular settings about the stub shafts 23 as previously described with reference to FIGS. 1 to 3 of the drawings. In addition to forming planting holes, the roller 36 compresses the intensively crumbled and mixed soil to some extent so that small plants can be introduced into the soil immediately after the roller 36 has moved thereover. This is conducive to the successful growing on of small plants and to the germination of any seeds which may, alternatively, be sown. The operator of the combination can sit on the seat 40 and hold the controlling handles of the tractor 1 or, if he prefers, he may control the combination as a pedestrian walking at the rear of the structure 39. It is to be understood that the planting roller 36 is only one example of a number of different soil compressing members that may be employed. An assembly of planting discs or a potato planter or the like may be substituted for the roller 36 and this is, of course, equally true of the previously described peripherally apertured roller 26.

It has been stated previously that the roller 26 is located "immediately to the rear" of the row of soil working members 9 and the expression "immediately to the rear" is to be interpreted as meaning that, in plan view (FIG. 1) the front of the roller 26 with respect to the direction A is so close to the paths traced by the free ends or tips of the tines 6 that said front is disposed substantially tangentially relative to those paths. It is pointed out that the circles indicated in broken lines in FIG. 1 of the drawings indicate the peripheries of the toothed pinions 10 and that the circular paths traced by the free ends or tips of the corresponding tines 6 are of greater diameter than those indicated although being concentric therewith.

While various features of the tractor and cultivator combination that has been described, and that is illustrated in the drawings, will be set forth in the following claims as inventive features, it is to be noted that the invention is not necessarily limited to these features and that it encompasses all of the features that have been described and illustrated both individually and in various combinations.

I claim:

1. An agricultural implement comprising a cultivator and a soil compressing planting roller, said implement having a frame and a plurality of soil-working members rotatably mounted on said frame, said members each being mounted on a corresponding upwardly extending shaft and said shafts extending in a row that extends transverse to the normal direction of travel, each of said members having downwardly extending tines that are rotatable about their corresponding shaft, and driving means connected to the shafts of said soil-working members to rotate the tines, said shafts and tines being arranged such that the width of the strips of soil worked exceed the perpendicular distances between adjacent tines, said planting roller being elongated and connected to said frame to extend generally parallel to said row, said roller being located to the rear of said cultivator, said planting roller having earth penetrating means that is mounted to move over the freshly worked and compressed soil and form planting holes in said soil, plant container means being supported on said implement to the rear of said row of soil-working members whereby plants can be introduced from the container means by an operator into said holes immediately after the passage of said roller.

2. An implement as claimed in claim 1, wherein said roller has a plurality of outwardly extending spikes that are laterally spaced apart on said roller.

3. An implement as claimed in claim 2, wherein said spikes are substantially straight and conical.

4. An implement as claimed in claim 1, wherein said plant container means comprises at least one plant containing box mounted on a mobile structure and said mobile structure has lateral parts carried by ground wheels.

* * * * *